United States Patent [19]

Rigazzi

[11] Patent Number: 5,415,140
[45] Date of Patent: May 16, 1995

[54] METHOD FOR MOVING A GROUP OF MEMBERS ALONG A TRAJECTORY BY MOVING A SECOND GROUP OF MEMBERS WITH A RECIPROCATING MOTION ALONG ANOTHER TRAJECTORY

[76] Inventor: Pier A. Rigazzi, Contrada San Marco, 6982 Agno, Switzerland

[21] Appl. No.: 916,994
[22] PCT Filed: Jun. 29, 1992
[86] PCT No.: PCT/EP92/01462
  § 371 Date: Aug. 18, 1992
  § 102(e) Date: Aug. 18, 1992
[87] PCT Pub. No.: WO93/01647
  PCT Pub. Date: Jan. 21, 1993

[30] Foreign Application Priority Data

Jul. 3, 1991 [CH] Switzerland ............ 1978/91

[51] Int. Cl.⁶ ............ F02B 75/32; H02K 49/10
[52] U.S. Cl. ............ 123/197.1; 74/25
[58] Field of Search ............ 123/55 A, 197.1; 74/25, 74/61, 87, DIG. 4; 310/46, 103, 152

[56] References Cited

U.S. PATENT DOCUMENTS

| | | | |
|---|---|---|---|
| 3,523,204 | 8/1970 | Rand | 310/103 |
| 3,992,132 | 11/1976 | Putt . | |
| 4,127,036 | 11/1978 | Pinto | 74/25 |
| 4,169,983 | 10/1979 | Felder | 310/103 |
| 4,207,773 | 6/1980 | Stohovic | 74/25 |
| 4,571,528 | 2/1986 | McGee et al. | 310/46 |
| 4,794,901 | 1/1989 | Hong et al. . | |
| 4,949,000 | 8/1990 | Petersen | 310/46 |

FOREIGN PATENT DOCUMENTS

| | | |
|---|---|---|
| 0152252 | 8/1985 | European Pat. Off. . |
| 2307132 | 11/1976 | France . |
| 747682 | 4/1956 | United Kingdom . |
| 2219671 | 12/1989 | United Kingdom . |

*Primary Examiner*—E. Rollins Cross
*Assistant Examiner*—M. Macy
*Attorney, Agent, or Firm*—Young & Thompson

[57] ABSTRACT

An apparatus moves, for example with a rotative motion, a member or a first group of members by moving another member or a second group of members with a reciprocating rectilineal motion by the interaction between magnets (1, 2) or groups of magnets (1ⁱ, 2ⁱ) fixed to the members or the group of members. If the reciprocating rectilineal motion is obtained by connecting one of the two groups of magnets to pistons of a two-stroke engine and to a mechanical energy-restoring system (8), a high-efficiency apparatus is realized, which is suitable for engine-traction, which does not need a crank-shaft, a lubricating system, a water cooling system, an alternator, or a torque converter, and which is automatically switched off when the vehicle is not in motion. The work-torque can be varied by varying the distance between the restoring system (8) and the supporting members (14) which are connected to the pistons (5). Easy and cheap to make, this apparatus causes little pollution and is suitable even for using hydrogen as a fuel. In this case, its pollution products are insignificant or equal to zero.

21 Claims, 12 Drawing Sheets

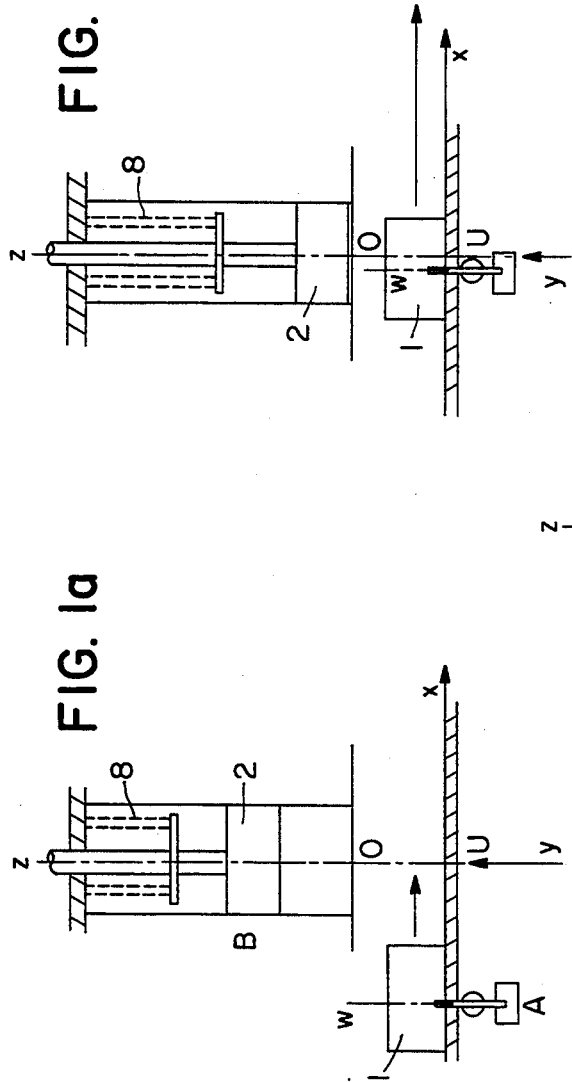
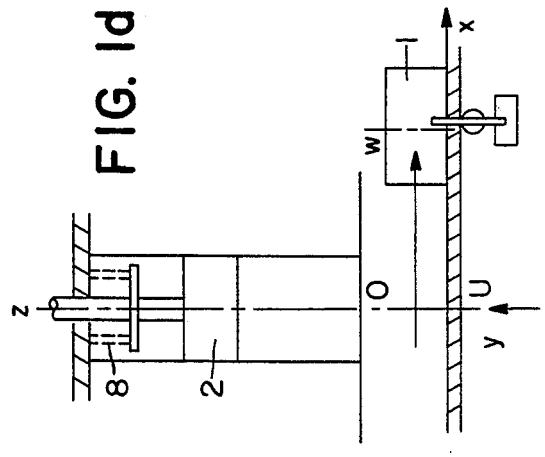
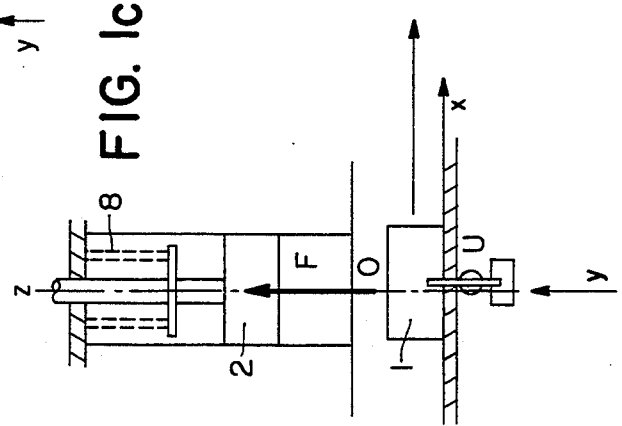

METHOD FOR MOVING A GROUP OF MEMBERS ALONG A TRAJECTORY BY MOVING A SECOND GROUP OF MEMBERS WITH A RECIPROCATING MOTION ALONG ANOTHER TRAJECTORY

SUMMARY OF THE INVENTION

The subject of the present invention is a method that, as far as its inventor knows, is conceptually totally new. Based on the studies of dynamics of magnetized elements he tried, the invention offers a system which may have several different uses, e.g. for car engines, for industrial vehicles, more generally for propulsion and, for example, for electrical current generators.

The apparatuses, adapted to realize the method herein, which are also the subject of the invention, offer important and, given the novelty of the concepts, unusual advantages, which will be explained in the following description.

The subject of the present invention is method for moving a first member or group of members along a trajectory, by moving a second member or group of members according to a reciprocating motion along another trajectory not parallel to the first trajectory. Forces originate from the interaction of the magnetic fields of two permanent magnets or of two groups of permanent magnets which are fixed on said two members or groups of members, respectively, without any mechanical connection or contact between the same two members or groups of members. The magnets of the group moved by rectilineal reciprocating motion are radially distributed on a plane around a geometrical center, and the magnets of the second group are fixed around an outer circumference of a cylinder having its rotation axis perpendicular to said plane and passing through said geometrical center. The cylinder moves according to a rotative motion. The rectilineal reciprocating motion of one group of magnets is obtained by connecting them to a group of as many pistons of one or more than one internal combustion engine. The rotating cylinder or magnetorotor, on which the other groups of magnets are fixed, is connected to a drive shaft. Magnets and pistons connected thereto perform an outward stroke due to gas expansion and combustion inside the cylinders. A return stroke is effected by the action of a mechanical-energy-restoring system as well as by the action of the mutual magnetic attraction between said groups. Thus, the motion of the first member or group of members is obtained without substantial energy loss.

Naturally, the magnets, for long-lasting efficiency, must have been "stabilized", and their temperature must be kept under a preset limit dependent on their constitution.

BRIEF DESCRIPTION OF THE DRAWINGS

Referring to the accompanying drawings, they show:

in FIGS. 1a, 1b, 1c, 1d a sequence of positions of two members fixed on two magnets, during motion obtained by the method of the invention;

DETAILED DESCRIPTION OF THE PREFERRED EMBODIMENTS

With reference to FIGS. 1a, 1b, 1c, 1d: from physics it is known that magnetic fields are irrotational, i.e., in this case, that the energy supplied or "absorbed" by the magnetic field from two ferro-magnetic objects, of which at least one is magnetized, during any movement along a closed path inside said field is equal to zero. This principle is valid also if said path closes at infinity.

Magnets 1 and 2 (which are allowed to move only along lines x and y, respectively), because of their mutual attraction, will lose, during their simultaneous movements from A to U and from B to O, an amount of potential energy exactly equal to the energy that an external force shall supply, for example to member 2, in order to pull it back over the extreme border limit of the magnetic field.

In other words, in FIG. 1a, if magnets 1 and 2, which may only move along lines x and y, respectively, are brought to a distance small enough for their mutual attraction to be initiated, they attract one another because of the related magnetic field, and are accelerated along line x and line y, respectively, acquiring kinetic energy and reaching the positions shown in FIG. 1b; at this point, i.e. immediately before their magnetic axes w and z lay one over the other and their poles mesh, if the magnet 2 is suddenly pulled back vertically, by an external force F shown in FIG. 1c along line y, so that the poles are very quickly separated before the braking action, magnet 1 would keep moving while they still were located at the position of poles-meshing Thus, the magnet 1 and a member eventually fixed to it will be able to keep on running along line x, with the kinetic energy that they had acquired up to that moment (FIG. 1d).

Figure 2:
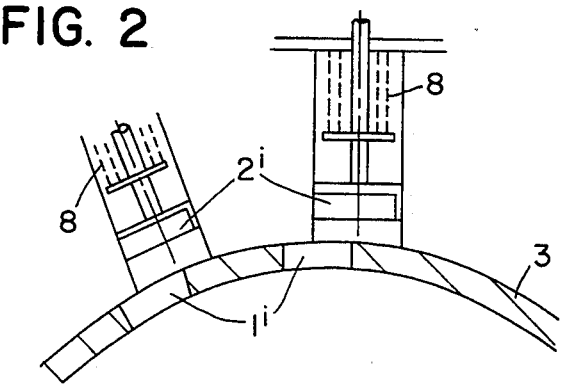
in FIG. 2 two groups of magnets, one of which is fixed on an external circumference of a rotating cylinder made from a nonmagnetic material.

Naturally, the sequence described above may be repeated indefinitely, as seen in FIG. 2, with other magnets $1^i$ entering the field of magnetic attraction at the same time as a spring 8 or a similar mechanical energy-restoring device returns magnet 2.

Then, magnets $1^i$, which are contiguous or equally interspaced, are fixed along the outer circumference of a cylinder 3 (obviously made from nonmagnetic material), and a certain number of magnets $2^i$ are positioned radially around said cylinder 3, all of them being provided with an energy-restoring system 8, it will be possible by suitably timing the action of forces F upon each magnet $2^i$, to move the magnetorotor, i.e. the rotating cylinder 3, with a rotative motion due to the pulling action on said cylinder 3 operated by magnets $1^i$. The concept is still totally valid if many groups if magnets $1^i$ and $2^i$ are stacked (one upon another) as shown in FIGS. 3 and 4.

Figure 3:
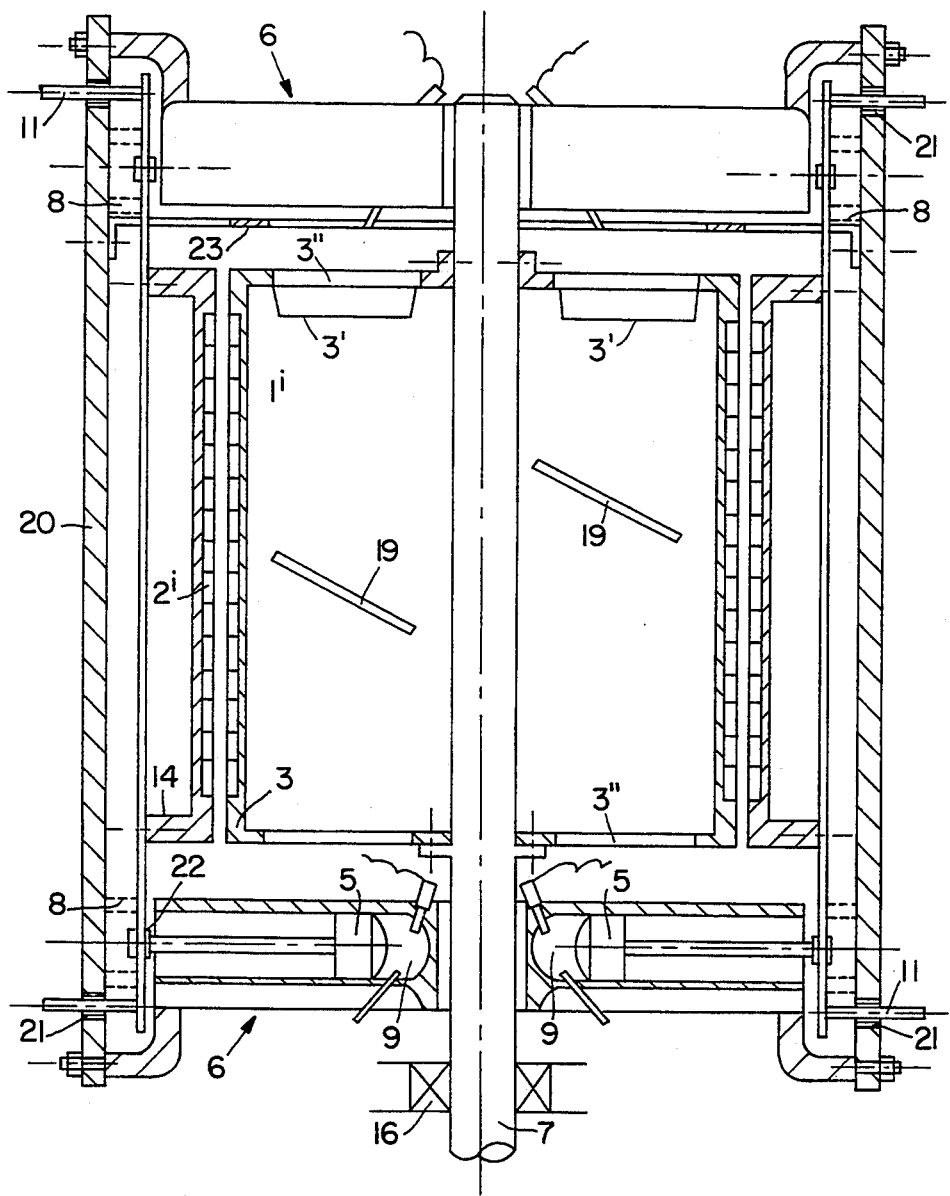
in FIG. 3 a cross section of an embodiment adapted to realize the method of the invention with connection to a pair of six-cylinder engines.
Figure 4:
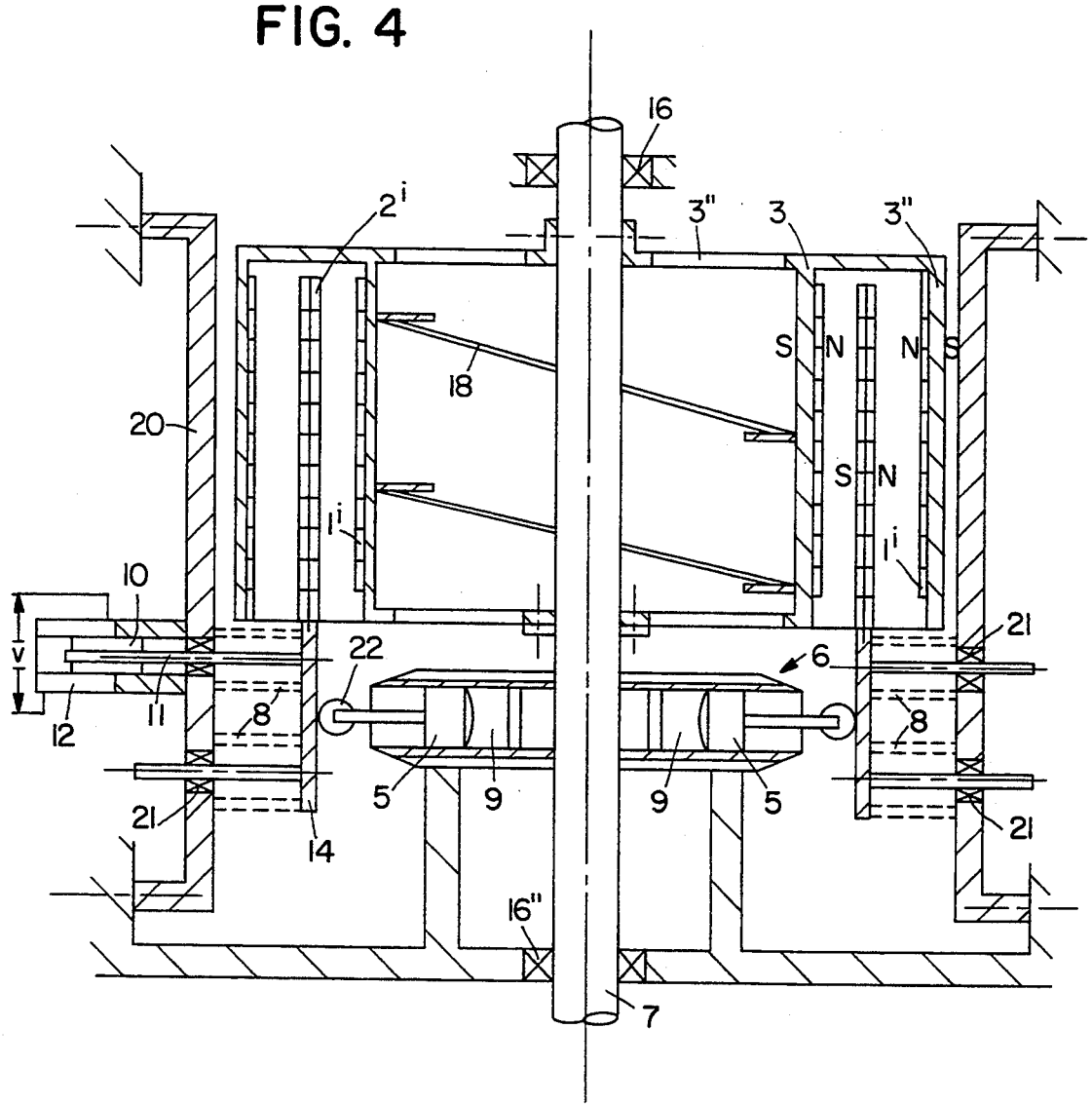
in FIG. 4 a further embodiment with one engine and double cylinder.

In order to exert forces F on magnets $2^i$ mechanically connect them to pistons of one or more than one internal combustion engine, preferably two-stroke engines 6, 6', both shown in FIG. 3, obtaining the result of transforming the energy supplied by the combustion engine into kinetic energy, actually mechanical energy of the magnetorotor 3, and of a drive shaft 7 rigidly connected thereto.

The energy supplied by each combustion cycle exceeds the work done by the magnetorotor 3 and will be restored to the piston by the energy-restoring devices, such as, for example, springs 8. As better explained later, the piston will cooperate to effect the compression inside the cylinder 3 for the following cycle.

In order to reduce the volume of the invention for a given power, it is useful to place close to one another the magnets $1^i$ and $2^i$ located along each circumference. For making that possible, without the action of each magnet $1^i$ and $2^i$ negatively interfering with the action of another adjacent magnet, it is useful to foresee a suitable aiming of the vector of the magnetic field of the magnets $1^i$ and $2^i$ by installing flux baffles 13 made from metal sheet and shaped for example as shown in FIG. 6, on said magnets $1^i$ and $2^i$.

Figure 6:
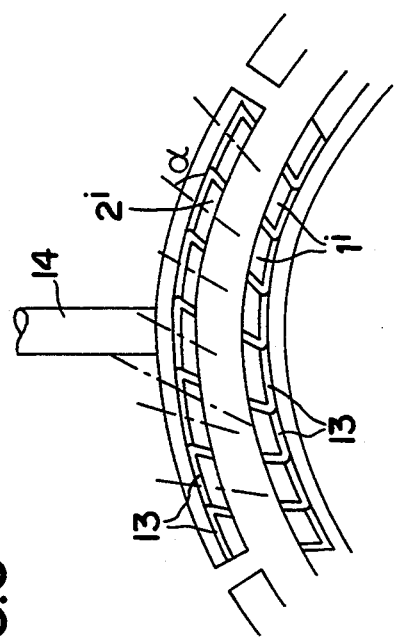
in FIG. 6 an arrangement for suitably laying and orienting the magnets which are fixed to the members forming the apparatus of the invention, coupled to a six-cylinder engine.

FIG. 6 shows one way of positioning the magnets $1^i$ and $2^i$, which way will be further described below, with the axis of the magnetic field inclined by a desired angle with respect to the faces of the magnets $1^i$ and $2^i$, being eventually stepped sideways by a suitable measure, but being slightly different for contiguous magnets, in order to correct the little scalar trajectory aberrations owing to the curvature of the parts. The magnetic flux baffles 13 have a wall parallel to this axis of the magnetic field, the direction of which is substantially parallel to the trajectory of the relative motion of the magnets $2^i$ moved by reciprocating motion with respect to the magnets $1^i$ on the cylinder 3 during the approach stroke.

Figure 9:
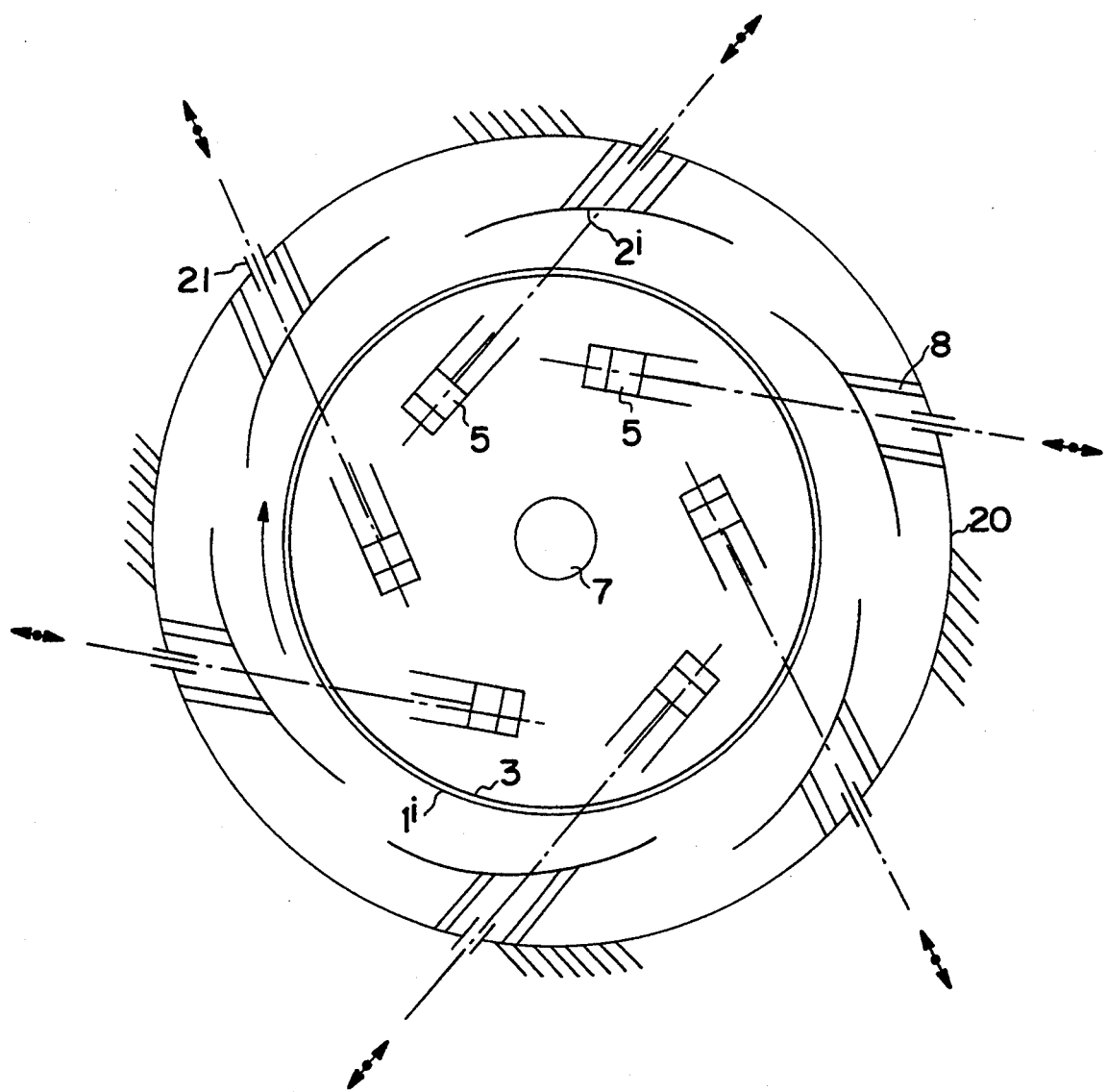
in FIG. 9 the schematic top view of an apparatus coupled to a six-cylinder engine with the cylinder axes inclined with respect to the outer surface of magnets of the rotating cylinder (magnetorotor)

The axes of motion of pistons 5, seen in FIG. 9 in a preferred embodiment, are substantially parallel to the axes of the magnetic fields of magnets $1^i$ or more generally not perpendicular to the outer face of the magnetorotor 3.

Figure 5:
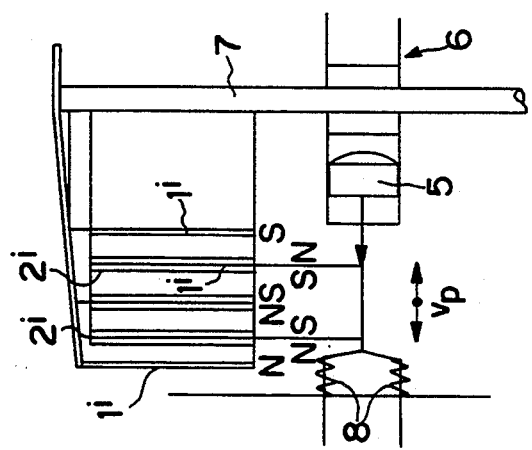
in FIG. 5 a schematic drawing of a further embodiment with one engine and a triple rotating cylinder.

It is to be pointed out that the flux baffles 13, seen in FIG. 5, increase the induction linked to the single magnets $1^i$ and $2^i$ in the area more effective for the working of the apparatuses adapted to carry out the method of the invention, practically eliminating the induction in the remaining areas. Therefore, use of the flux baffles 13 is often advisable. FIG. 6 also shows a further improved embodiment of the apparatus: by linking parts 14, many contiguous magnets $1^i$ and $2^i$ are connected to one piston. For example, in the case of a 6-cylinder engine, the number of pistons is equal to 1/6 of the total number of the magnets $2^i$ installed along a single circumference of the magnetorotor 3.

Many rows (e.g. 10 in FIG. 4), carrying the selected number of magnets $2^i$, may be stacked one upon another. If 42 magnets are installed along a circumference of the magnetorotor 3, for example, each piston 5 and 5' is connected to $42/6 \times 10 = 70$ magnets, thus allowing the use of the energy supplied by the combustion occurring inside the related cylinders 3 and 3'.

The form, induction, number and dimensions of the magnets $1^i$ and $2^i$ may be varied, and there are several possible ways of aiming the magnetic fields and positioning the magnets $1^i$ and $2^i$ on the various parts; the most useful solutions will be described, case by case, by the test work.

For constructing magnetorotors 3 and more general components which move within the various magnetic fields, it is naturally necessary to choose nonmagnetic materials, with good mechanical resistance.

Such an embodiment as a propeller coupled to one or more internal combustion engines is advantageous also as far as efficiency is concerned. In order to understand this statement, it will be useful to consider the energy balance of the apparatus, referring, for easier comprehension, to only one pair of magnets $1^i$ or $2^i$, as shown in FIG. 2.

It has to be first considered that, given the features of the apparatus, the amount of energy lost because of friction is extremely low.

As mentioned previously, the potential energy of the two magnets $1^i$ and $2^i$, during their mutual approach due to magnetic attraction, becomes kinetic energy for both magnets $1^i$ and $2^i$. However, the kinetic energy of magnet $1^i$ alone makes the cylinder 3 rotate.

The kinetic energy of magnet 2, though, if connected, as shown, to a piston of an internal combustion engine, is not wasted, as it becomes, during the return stroke of the piston, compression work of the gas, as already mentioned, inside the cylinder 3 before the next ignition.

The curve of the magnetic attraction force related to the distance is, however, similar to the curve of a "pseudoadiabatic" compression.

In order to achieve the maximum efficiency of the apparatus, a suitable way to go is to relate electronically, by well know methods and control devices, the injection and ignition timing to the positions of magnets 2 (or also of the members fixed thereto) with respect to the rotating cylinder 3, to its rotational speed, to the amount of injected fuel, to all these factors together, or to other factors depending on the type and the way of the working of the selected electronic control device.

By so doing, the result is obtained that back and forth strokes of the magnets $2^i$ correspond to a predetermined rotational angle of the magnetorotor 3 and that predetermined trajectories are followed in order to get the most proper work cycle of the magnets $2^i$.

For purposes better explained in the following parts of the description, the electronic control system might also take into account the motion of a device (also better explained later on) operated by a driver i.e. a device that "activates" a given number of pistons.

Further, and for similar reasons, it is useful to regulate the injected amount of fuel at the same time, relating to the rotational speed of the magnetorotor 3.

A stopping device, for example a stiff ring 23 (FIG. 3) stops magnets $2^i$ from touching magnets $1^i$ if an accidental compression failure inside a cylinder 3 occurs.

Figure 8:
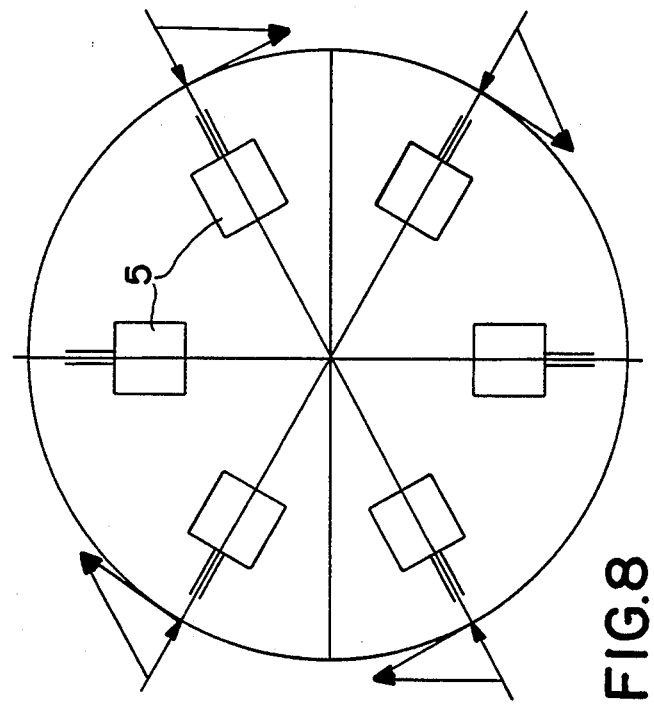
in FIG. 8 a schematic drawing of the balanced distribution of vector forces for simultaneous explosions in four cylinders.
Figure 7:
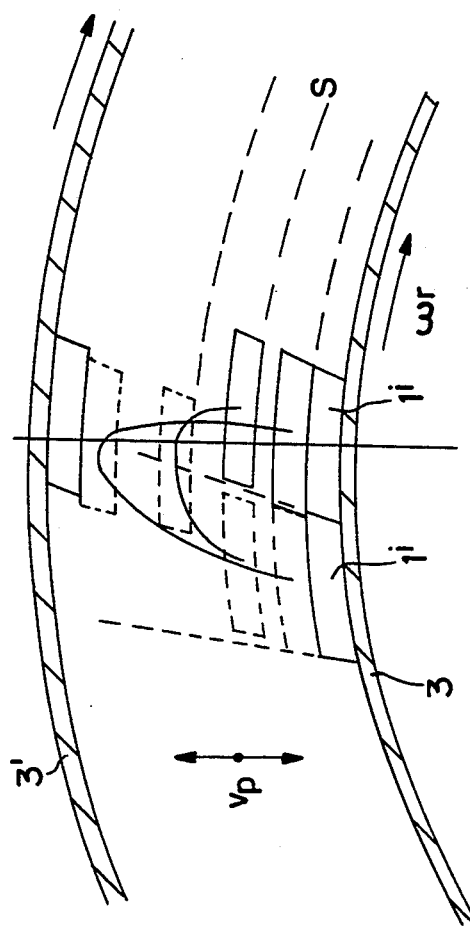
in FIG. 7 a schematic drawing, concerning only one magnet, reciprocated by one piston, one magnet of the first rotating cylinder and one magnet of a second rotating cylinder integral with the first one.

Considering the description to this point, it is clear that a propeller derived from the method which is the subject of the invention does not require a crank shaft or linking rods. Hence, it will be possible, by the driver-operated devices, connected to an electronic control box of a known type, to cause both injection and ignition in some or all of the cylinders 3, depending on the power or torque to be supplied. If then it is preferable in FIG. 3 (subject to worsening the noise level) to eliminate fully the strains (already very small, given the low speed and the fractioning of the cylinder 3) radially acting on bearings 16, 16' of the drive shaft 7 connected to the magnetorotor 3 in FIG. 4, it is possible in one embodiment, to foresee that, for example in a six-cylinder engine 6' for five different positions of the driver-operated device (i.e. a pedal), injection and ignition occur in none, two, three, four or six cylinders, geometrically positioned in such a way that the resulting force produced by the radial components acting on the pistons 5, and its resulting torque produced around the rotational axis are at any time equal to zero (FIG. 8). The higher the number of pistons 5, the "smoother" the apparatus will work. As already mentioned, the axis of pistons $5_i$ are not necessarily perpendicular to the surface of the magnetorotor 3. A possible solution foresees axes inclined with respect to the outer surfaces of the magnets $1_i$ (FIG. 9) fixed on the magnetorotor 3.

For normal appliances, such as car engines, it may be advisable to interconnect all the pistons, mechanically and/or connecting the various combustion chambers so as to get an exact and easier synchronization among them, notwithstanding the slight differences of, for example, the mechanical loss due to the friction effect related to the various pistons. In such a case, all the pistons 5 would work the same way and contemporaneously.

By carefully dimensioning (for example, drive ball bushings 21), the driving with the lowest possible friction of magnets $2_i$, or more properly of shafts 11 supporting them, and their linking system 22 to pistons 5 (for example, a sphere on a point 22 in FIG. 4), it is easy to reach the result that the forces effected on the pistons 5 by the group of magnets $2_i$ linked to them do not have any component cutting the axes of the cylinders 3", as they are purely axial, and this arrangement considerably limits friction and overheating on the cylinder walls (due in this case only to the pressure of the compression seal-rings), significantly or totally reducing the need for lubricating the cylinders 3", the need for oil-whipping etc., with evident economical and environmental advantages. To start the apparatus, given its features, it is sufficient to let the magnetorotor 3 rotate a small angle up to the meshing of reference points, for example installed on the rotor and on a nonrotating part, respectively, which the electronic control box uses to perform its functions. After the first combustion, the apparatus will run automatically. The reference points are not shown in the figures. For the starting operation, it is possible to use well known means, such as a "gear-box" type lever with reduction gear, or a pulley and wheel device, connected to the rotor or other similar solutions, not shown in the figures. In the stand-by situation (with the vehicle not in motion or even just with the pedal at a position 0 in the case of motor vehicles), the propeller is inactive and no combustion occurs.

In order to generate the charging current for the batteries of the vehicle carrying the device according to the invention, it is sufficient to fix one or more magnets 10 to one or more members moved by reciprocating motion (one of these members shown in FIG. 4 is the shaft 11 mounted on a supporting member 14, also called a cursor, of magnets $2^i$) and to mount one or more members 12 on one or more parts of a fixed structure 20, said parts being able to transform the energy produced by the reciprocated mutual approaching and separating motion of the magnets 10 into electric current. The members 12 may be simple induction coils, on whose end-contacts an alternate voltage will be drawn, a voltage that, when rectified by known methods, can generate the charging current of the battery or batteries.

This result is also possible with low values of magnetic induction linked to each single magnet, since its variation is very quick, and therefore relevant to the voltage $$e = -\frac{d\phi}{dt}$$

at the end contacts of the coils.

A preferred embodiment shows the use of relatively large diameter pistons 5 with limited compression strokes which are shorter than the distance between two facing magnets $1^i$ and $2^i$ when on the borderline of the sensible attraction field.

The disclosed propeller is applicable in many cases; e.g.: for propulsion on cars, agricultural, transportation and industrial vehicles, coupled to the rotor of helicopters and, more generally, as a propeller for a rotating shaft, for example the shaft of motor-operated current generators.

There are considerable advantages offered by the method of the invention and by the propeller derived therefrom; for example, in the field of motor vehicles, they eliminate the need for many costly devices traditionally coupled to an internal combustion engine, such as:

crank shaft with related supports and bushings;
linking rods with related supports, pins, bushings, etc.;
fly wheel, i.e. the magnetorotor, suitably dimensioned, is a fly-wheel "per se";
gear box: since at any rotational speed the torque can be varied by activating or deactivating a determined number of pistons, or by regulating the energy per cycle, and/or by varying the distance between springs 8 and cursors 14, it may be sufficient to have a simple gear box for forwards and backwards motion, or a gear box with fewer gears than traditional gearboxes;

the starting motor: the starting operation can be done manually as described;

the alternate or direct-current generator for charging the battery;

the torque converter for heavy duty vehicles;

the device, recently developed and realized, for automatically switching off the engine when the vehicle is not in motion;

the lubricating system for the pistons and for the engine as a whole; and the cooling system: with engines, given the low temperatures and the dimensions of the heat-exchanging surface, and given the empty space inside the magnetorotor 3, a helicoidal profile 18 seen in FIG. 4 is mounted therein, or fins 19 shown in FIG. 3 are similarly located and can convey sufficient air through holes 3'' formed on lids 3' of the rotating magnetorotor 3 for a sufficient cooling down; also, the lids 3', if suitably shaped, can work as cooling ventilators 3' seen in FIG. 3.

The resulting specific fuel consumption is very low, as will be explained later.

The total weight of the propeller and of all the essential parts is considerably reduced, with all the attained advantages; especially during city use, owing to the high value of the air/fuel ratio and the relatively low adaptable working temperatures, pollution can be reduced to almost zero.

All that mentioned above allows one to spare a number of used parts; on the assembling time, one could considerably reduce the costs of a motor vehicle, or make it possible to give more space to optimal solutions which nowadays have not been adopted owing to their costs. Such a solution would include the use of hydrogen as a fuel which is very suitable for the device herein, and in the inventor's opinion, would represent a unique positive improvement in the fight against pollution. The invention tries to solve the problems, by now very heavy, deriving therefrom, contemporaneously improving the situation of many areas now suffering long periods of draught; as it is known, the result of the combustion of hydrogen is water vapor. Thus, it is not necessary to consider nitrogen oxides, thanks to the device according to the invention.

At the same time, with said device, it is possible to maintain performance and acoustics, both psychologically important, of the internal combustion engine.

Basically nothing changes if, because of costs and needed power, only one internal combustion engine, (FIGS. 4 and mounted above or below the magnetorotor 3 is used, instead of two. Instead of a simple magnetorotor 3, a double one 3' seen in FIG. 4 or more generally a multiple one is used. Carrying magnets, with the poles oriented as shown in FIG. 4, in order to achieve a sort of "double effect", with higher power, are used. Moreover, the number of coaxial rotating cylinders 3' is greater than two, and more than one system of magnets $1^i$ and $2^i$ is operated by the pistons 5.

In dimensioning the magnetorotors 3, it will have to be taken into account that, for two integral coaxial rotors, with peripheral speeds equal to $wr_1$ and $wr_2$, respectively, the distance between two adjacent magnets shall respect the equation:

$$p_1 \cdot p_2 = r_1 \cdot r_2$$

wherein:

$P_1$ = distance of magnets $1^i$ on first rotor;

$P_2$ = distance of magnets $2^i$ on second rotor;

$r_1$ = radius of first rotor; and $r_2$ = radius of second rotor.

However, it is not strictly necessary, if not considering the power at stake, that one of them, preferably magnet $2^i$, may be simply made from a ferromagnetic metal, therewith further reducing the propeller's cost.

As already mentioned, the magnets $1^i$ and $2^i$ can be suitably oriented, with or without flux baffles 13 mounted on them (see FIG. 6), and can be variably spaced, or quite contiguous.

A further advantage to point out is the very unlikely probability of failures due to breakages: there are few parts that come in contact and, moreover, an incorrect timing will only reduce the engine's efficiency, even down to zero, but without further risks.

It is interesting to consider the energy balance involved in the working of the apparatuses according to the invention.

By naming:

$E_s$ as the total energy to be provided to the system;

$E$ as the energy generated by one combustion;

$E_c$ as the energy for the compression inside the cylinder;

$L_M$ as the total energy needed for separating magnets $2^i$ from magnets $1^i$;

$L_{M2}$ as the total energy needed for opposing magnets $2^i$ against the repulsive magnets fixed on the magnetorotor 3;

$L_K$ as the compression work effected by the mechanical energy-restoring system 8;

$L_Y$ as the energy supplied along axis y, and therefore to pistons 5, by magnets $2^i$ during their approaching return-stroke toward magnets $1^i$;

$L_X$ as the energy drawn along axis x, i.e. according to the rotation of the magnetorotor 3; and considering that the total potential energy is lost by magnets $1^i$, and $2^i$, $L_M$ is equal to $L_x + L_y$. Thus, it is possible to write:

$$E_s = L_M + L_K$$

$$E_c = L_K + L_y$$

and subtracting member by member:

$$E = E_s - E_c = L_m - L_y$$

i.e. substituting:

$$E = E_s - E_c = L_x.$$

In other words, considering the compression work as recovered energy, it is obtained that, excluding losses due to friction (very low) for example of the shafts 11 on the drive ball bushings 21 (FIG. 4), the consumed energy E is exactly equal to the energy drawn on the magnetorotor 3 ( excluding the thermodynamic efficiency).

In the case of double or multiple magnetorotors 3, if the magnets $1^i$ mounted on the cylinder 3 are used, it will be necessary to supply the energy $L_{M2}$ for opposing them against the magnets $2^i$, thus increasing the power, but reducing the efficiency and extending the lifetime of the magnets $1^i$ and $2^i$. The opportunity of using repelling magnets, therefore, has to be carefully examined case by case.

With multiple magnetorotors 3, but only with attractive magnets $1^i$ and $2^i$, the arguments made above about energy however remain valid, and higher powers and compressions will be achieved.

As both the method according to the invention and the propeller adapted to realize it are completely new, it is clear that a wide range of modifications and improvements are possible, so as to achieve the best results for different appliances; the embodiments shown in the accompanying drawings and mentioned in the description concern only preferred examples; thus, they are not binding and are not limiting with respect to the subject matter of the invention.

It is easy to understand that the adjustments of the device, in the case, for example, of constant power and rotational speed, such as when the invention is coupled to a generator, are very simple.

In that specific case though, for discontinuous functioning, it will be necessary to start the device by an automatic starting device of a known type, which will let the magnetorotor 3 rotate by only a small initial rotational angle, without having to effect any compression cycle.

The internal combustion engine most easily adaptable to be coupled to one or more magnetorotors 3 will now receive a more detailed description.

Figure 10:
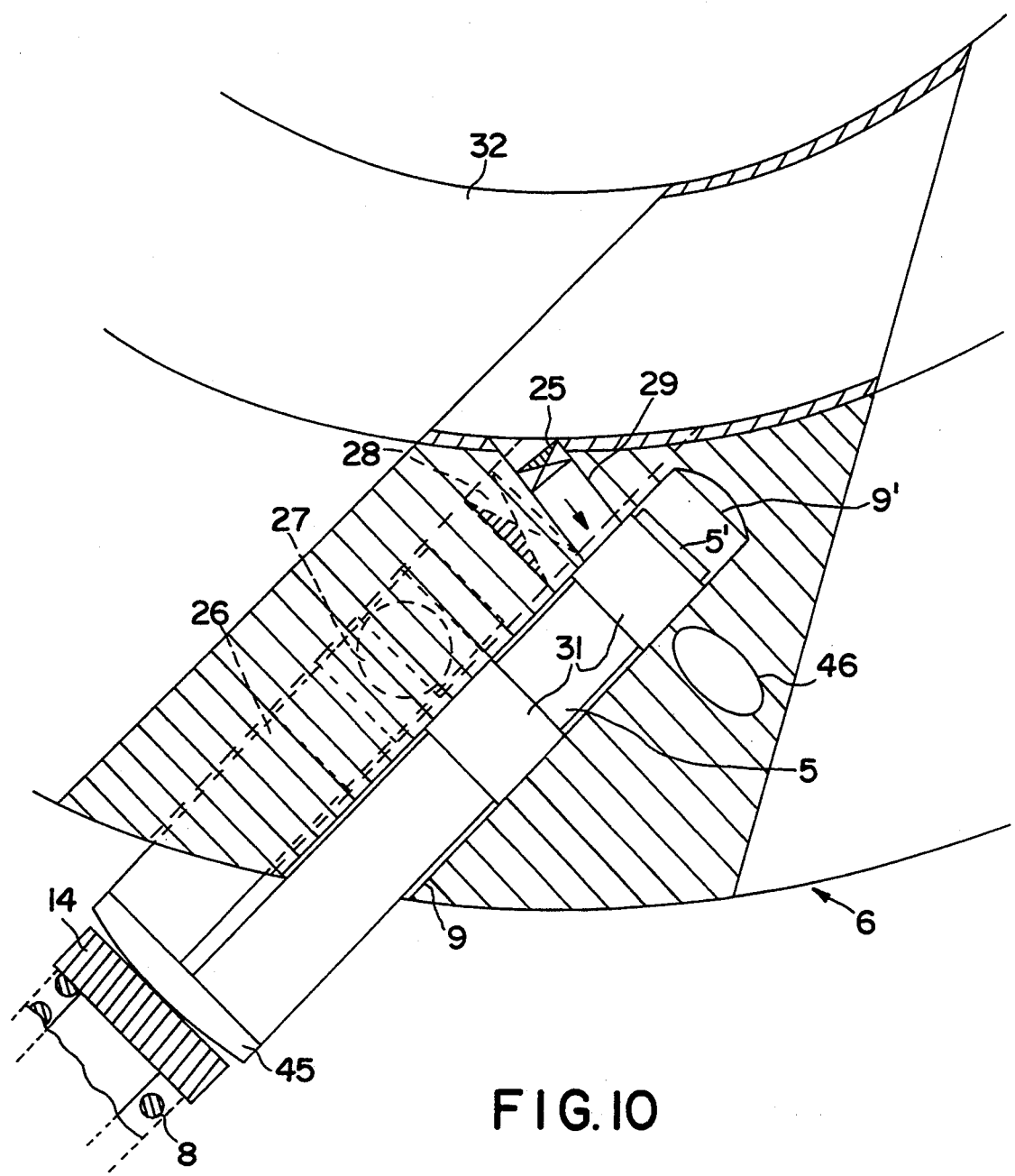
in FIG. 10 a cross section of the engine taken along a plane parallel to the sheet of the drawing and comprising the axis of a piston to show the parts more clearly of a scavenging-air compression cylinder which has also been represented, although it is located below the plane.
Figure 13:
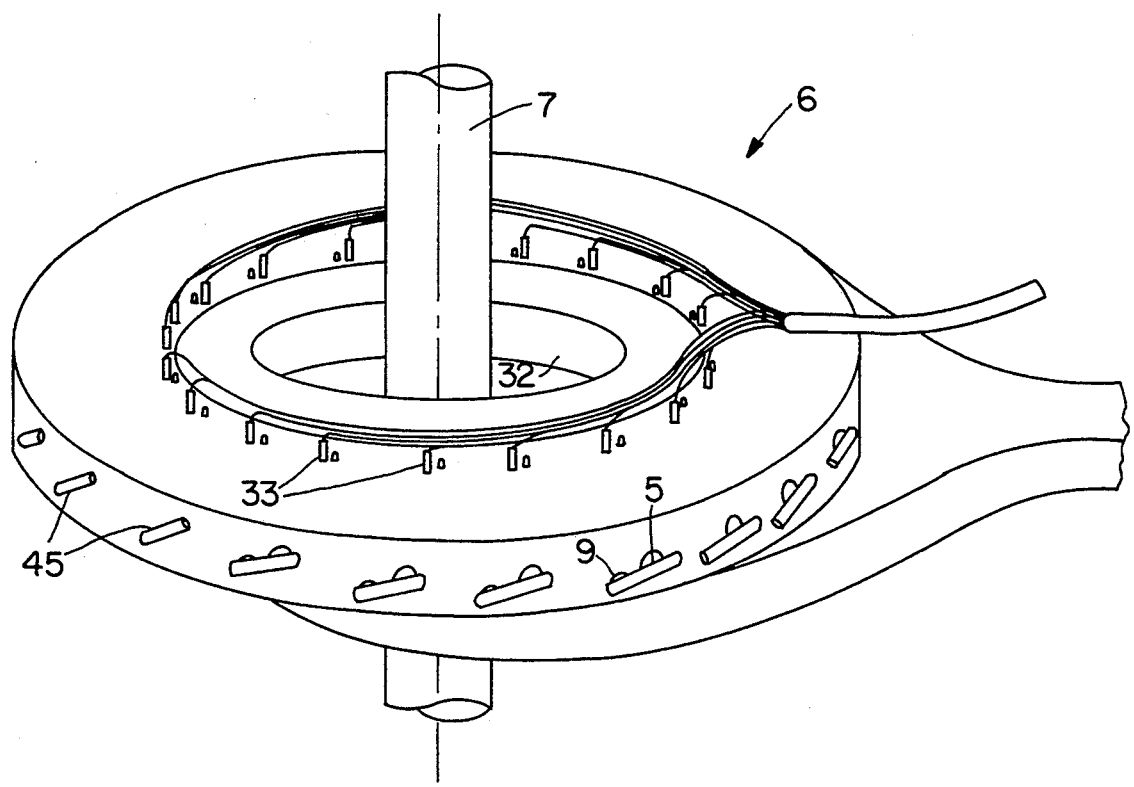
in FIG. 13 a prospective view of an engine with as many cylinders as magnets located along a circumference of the magnetorotor.

With reference to FIGS. 10 and 13, the fuel is admitted into the combustion chambers 9' of a selected number of cylindrical bores 9 by preferably direct electronic injection, according to the torque or the power needed at each moment.

The timing of such injections, its regulation and the ignition time, when not in the presence of a Diesel self-igniting cycle, are all controlled, as previously said, by an electronic control system of a known type, named a control box and which is programmed in such a way so as to measure continuously various parameters, such as the rotational speed of the magnetorotor 3 (as well as of the drive shaft 7 fixed thereto), and its angular acceleration which can be understood from the type of operation: speeding-up or slowing down, which a driver may want to effect by moving, for example, the accelerator pedal, the brake pedal or other driving members.

Figure 17:
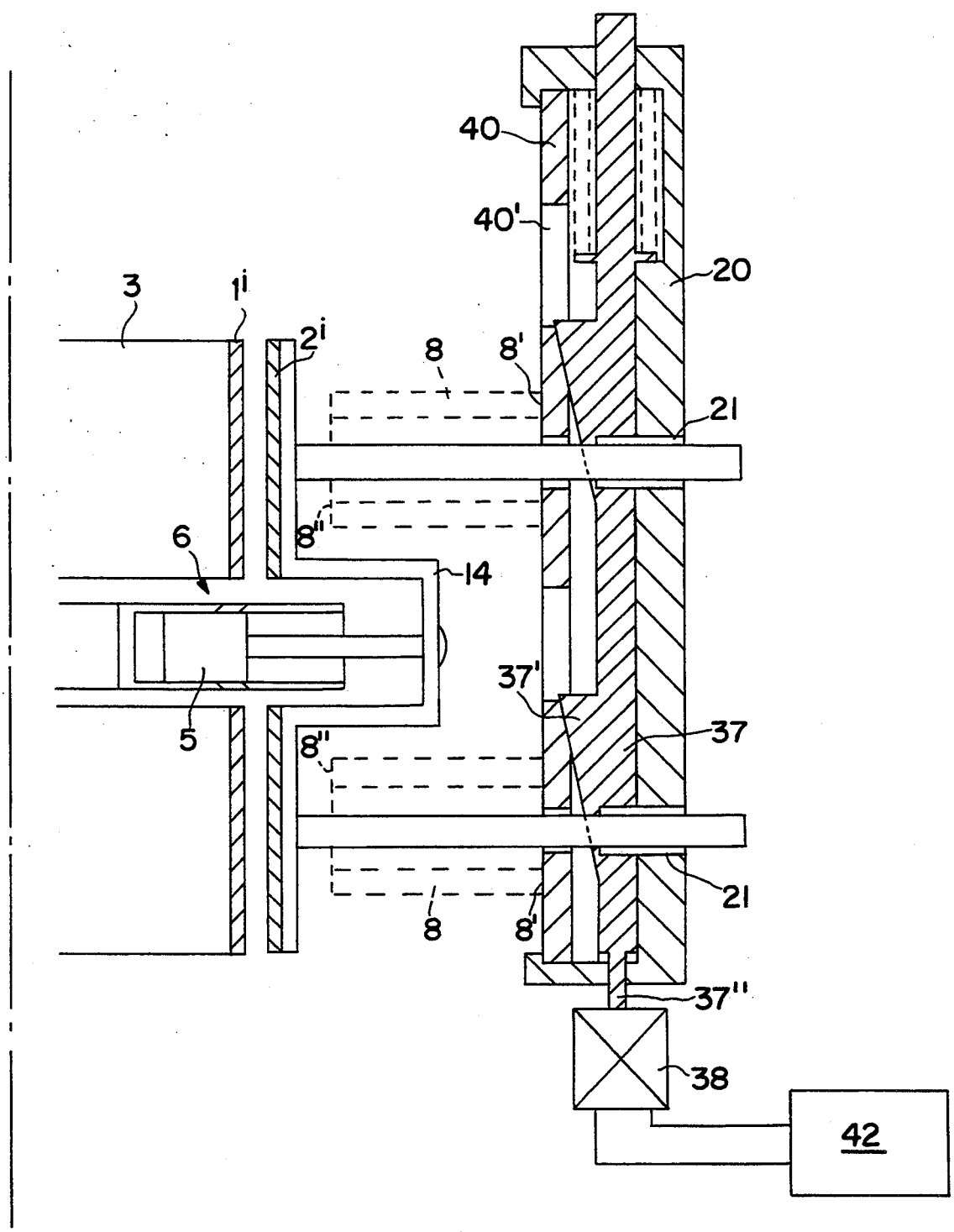
in FIG. 17 a side view of a longitudinal section of the mechanical energy-restoring system, with variable distance between springs and a fixed structure, according to one embodiment of the invention; and in FIG. 18 a map of the trajectories, which may be achieved, with and without the energy-restoring system, respectively.

Such a control box 42, given its indefinite nature, has been schematically represented only in FIG. 17.

In order to perform its functions, the control box 42 can be based, for example, on the measurements of the relative positions occupied by reference members located on the magnetorotor 3, the drive shaft 7, and a selected nonrotating part.

Figure 16:
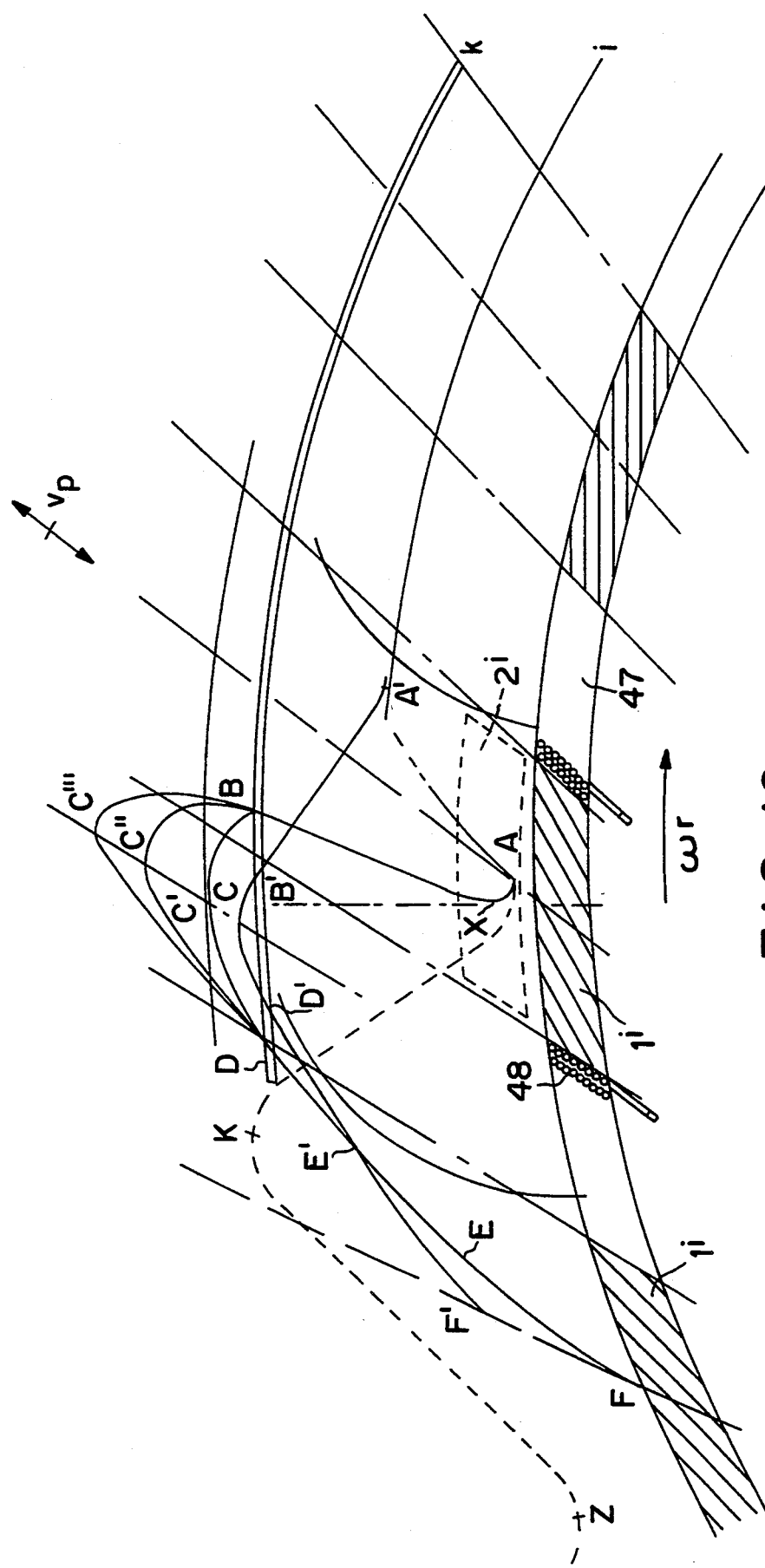
in FIG. 16 a diagram of the curves of the trajectories followed by the center of a magnet or of a ferromagnetic member moving integrally with a piston with respect to the magnetorotor.

The caloric energy coming from the fuel in combustion, together with the compression energy of the work effected, along the approaching trajectory between magnets $1^i$ and $2^i$, both by the magnetic field and by the kinetic energy of the piston 5, as well as of the members integral thereto, due to the action of the energy-restoring system 8, suddenly separate magnets $1^i$ and $2^i$, letting them follow one of the relative motion trajectories shown in FIG. 16, having a required inclination depending on the ratio between the speed of the piston 5 along its axis and the peripheral speed of the magnets $1^i$ on the magnetorotor 3, and also depending on the inclination of the axis of the pistons 5 with respect to the surface of the magnetorotor 3.

The work to be effected for quickly separating the magnets $1^i$ and $2^i$ is equal to the total potential energy of the magnetic field, but a part of it will be restored by the magnetic field in the form of compression work in the next cycle.

This restoration means that, if the fuel combustion supplies the piston 5 with an amount of energy in a predetermined measure higher than the difference between the total potential energy and the restored compression work, the same piston 5 will gain a certain amount of residual kinetic energy, effecting a longer compression stroke in the following cycle. On the contrary, when supplying the piston 5 with an amount of energy exactly equal to the above difference, the same piston 5 will move with the same velocities as in the previous cycle, velocities mostly caused by the expansion of the compressed gas (at different compression ratios, depending on the rotational speed of the magnetorotor 3).

In other words, the combustion energy adds itself to the gas expansion energy, in order to supply the system with the energy which is drawn at each cycle by the magnetorotor 3.

In fact, knowing the mass of all the members integral with the piston 5 during its motion, (i.e. magnets $2^i$ fixed thereon plus linking parts 14 supporting and connecting them to the piston 5), and the mass of the same piston 5, it is easy to determine how much caloric energy is needed in order that the piston, after the combustion, and after having separated magnets $1^i$ and $2^i$, keeps a required velocity $v_p$ along the direction of its axis. Referring to FIG. 16: given the rotational speed of the magnetorotor 3 as well as its peripheral velocity wr, the amount of calorific energy (i.e. the fuel) is regulated so as to generate the required ratio between the peripheral speed wr and $v_p$, in such a way as to originate relative motion trajectories, during separating and approaching strokes of the magnets $2^i$ with respect to the magnets $1^i$, with the most suitable inclination for properly dividing in a required way the magnetic field energy between drawn mechanical work and compression work in the cylinders 3 and/or for obtaining mechanical work according to a rotational sense or according to an opposite sense.

In the present description, both magnetized members $1^i$ and $2_i$ are for conciseness named "magnets", but in reality, when the required power is not high, "magnets" $2^i$ are preferably simple ferromagnetic members, eventually made from thin insulated metal sheets with the axis substantially parallel to the trajectory along which the magnets $2^i$ run while the linked flux variation reaches its maximum value.

Figure 18:
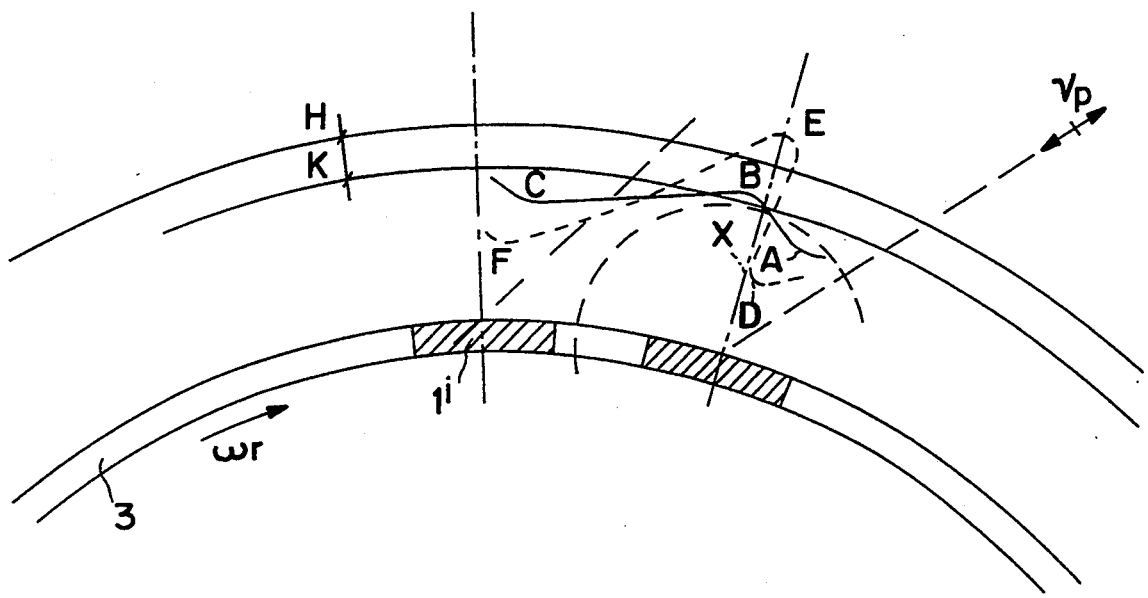

That reality allows smaller variations of the magnetic quantities B and H linked in FIG. 18 to the magnets $1^i$ during their relative movement with respect to the magnets $2^i$, assuring a longer efficiency of the magnets $1^i$ even without a cooling action. As a result, the cost of the magnetorotor 3 is considerably reduced.

The eventual small loss of permanent induction flux of the magnets $1^i$ and $2^i$, which should occur after a certain period of use, can however be recovered, at the end of the period, letting a direct current flow through coils 48 (FIG. 16), permanently fixed around magnets $1^i$ and, for example, immersed within a resinous supporting layer 47; such coils 48 are normally open while the motor works, in order not to create inducted magnetic fields, which are disadvantageous for the dynamic and energetic balance of the engine 6.

The cursor-supporting magnet $2^i$ in FIG. 17, moving integrally with the piston 5, even if only by the effect of mechanical contact, during the outward stroke, meets the energy-restoring system 8 at point B in FIG. 18; and then, because of losing its kinetic energy at point C, the magnet 2' runs back in the opposite direction and (not taking into account energy losses due to friction, which are however very small) with the same kinetic energy, i.e., the masses being constant, with the same (as an absolute value) velocity $-v_p$, in the direction represented in FIG. 16.

The magnet $2^i$ will thus run an almost rectilinear stroke DE, being contemporaneously attracted with increasing intensity by the following magnet $1^i$, and the piston 5 integral with the magnet $2^i$ will begin the compression for the next cycle.

Due to the simultaneous actions of the residual kinetic energy of the magnetic field of the magnets $1^i$, and of the resistance to the compression effected by the gas contained inside the cylinder 3, the magnets $2^i$ will follow the trajectory portion EF, while the required amount of fuel is injected, suitably timed and regulated, into the combustion chamber 9' of the cylindrical bore 9, as shown in FIG. 10, wherein the fuel will be, again with suitable timing, ignited.

Such ignition, in addition to the effect of the expansion of the compressed gas, will cause a quick pressure increase inside the cylindrical bore 9; when the piston 5 finds itself at point A in FIG. 18, the piston 5 will be pushed back, as already said, at a predetermined velocity $v_p$.

For different rotational speeds of the cylinder 3, it will be possible to choose suitable values of $v_p$ so as to obtain the most advantageous trajectories under the aspect of mechanical and energetic efficiency.

The portions of the trajectory due to the suction and scavenge phases have been shown in detail, because they are portions with a constant value of $v_p$.

In the case of high powers and rotational speeds, the amount of kinetic energy to be used is large, and consequently high compression ratios, around 40:1 and over, are reached; in order not to increase excessively the area of the pistons 5, (which can be however more than one for each magnet $2^i$, stacked upon one another), it is advisable to use diesel fuel or similar suitable essences as fuel.

In the case of lower compression rates, any kind of fuel can be used, provided that electrodes 33 (FIG. 12) are inserted, for the fuel-timed ignition.

The theoretical explanation of the results of a low specific fuel consumption offered by an engine 6 operating according to the invention can be deduced from the formula of the ideal thermodynamic efficiency rate $\eta$ id of the Diesel cycle taken as a reference-cycle, wherein:

$$(K)\ \eta\ id = 1 - \frac{1}{\rho^{X-1}}\ \frac{\tau^{1X} - 1}{(\tau^1 - 1)X}$$

(In reality, with the present engine 6, any kind of cycle can theoretically be obtained from the same kind of fuel.) wherein:

$\tau^1$ is the ratio between final and initial temperatures of the combustion during the phase at constant pressure;

X is the ratio between the specific heats which can initially be assumed as equal to 1 to 40; and $\rho$ is the compression ratio, which varies in the concerned engine 6.

As already explained in the description, p varies depending on the supplied power, i.e. on the return-stroke length of the pistons 5; again according to such stroke, the amount of fuel to be burnt in a cycle is different, said amount being proportional to the total work needed in order to separate magnets $2^i$ from magnets $1^i$.

The amount of air in the cylinder 6, which as a matter of fact results in a much higher value than the minimum stoichiometric value, is, on the contrary, constant. This fact causes the temperature to increase in a cycle due to the combustion which also varies according to the drawn power; similarly, the behavior of the temperature increase is due to the compression of the gases inside the cylinder 3.

Assuming that the air is sucked in at a temperature of 27° C., in a theoretical case, for example, at the maximum power, the gas temperature at the end of the compression ($\rho=9$) is about 433° C., the $\Delta$ t (temperature increase) due to the combustion is (only) 120° C. and the final temperature is 553° C.; accordingly:

at maximum power: $\rho=9$; $\tau^1=1.17$; $\tau^{IX}=1.24$

Substituting these measurements in Equation (K), the efficiency ratios are as follows:

at maximum power $\eta$ id$=0.58$.

As it can be clearly seen, with a compression rate $\rho=9$, it is possible to achieve thermodynamic efficiencies higher than the maximum efficiency of a traditional Diesel engine at the best condition, with some $\rho$.

Furthermore, considering that, with relatively low temperatures, the external thermal losses are easily reduced and the dissociation of $H_2O$ and $CO_2$ is extremely limited, if not quite zero, the thermal and thermodynamic efficiency of the engine 6 is easily comparable with the same efficiency of the traditional internal combustion engines.

It has to be further added that the mechanical and organic efficiency of the engine 6, from the cylinder 3 to the gear box, in the related example, can be assumed as ranging around 0.90 to 0.92, while the same efficiency for a traditional fixed-geometry engine with a crank shaft, normally is not too far from 0.60.

At this point of the explanation, it is useful to describe an example of an approximate planning of an engine according to the invention, working according to the related method.

First of all, the angular inclination of the pistons 5 with respect to the magnets $1^i$ and $2^i$ of the magnetorotors 3 are prefixed (for example 45°).

Due to this inclination, about 68% of the total work $L_M$ of the magnetic fields gives mechanical work; the remaining 32% gives compression work $L_c$.

When separating the magnets $1^i$ and $2^i$, while they are running stroke AB seen in FIG. 16, an extra amount of mechanical work $\Delta$ E is drawn, approximately equal to 30% of the total work of the magnetic fields. It is therefore possible, for the approximate planning, to consider the total mechanical power as substantially equal to the total magnetic field work $L_M$ per second.

The work is expressed as follows:

$$L_M = \frac{1}{Z} F_{pn} \cdot \Delta 1 \cdot q^2 \cdot p \cdot n$$

(wherein Z is a numeric coefficient which may be assumed as$=7$.)

$F_{pn}$ is the total attraction force exerted by the magnets $1^i$ connected to the piston 5, approximately equal to 80% of the theoretical force between the magnets $1^i$ and $2^i$ at zero distance since, in reality, between the magnets $1^i$ and $2^i$, even when as close as possible to each other, a space of a few tenths of a millimeter is always left;

Δ1 is the maximum distance where the attraction force between the magnets $1^i$ and $2^i$ is "sensible", i.e. assuming such force, for example, is equal to 1/200 of the above-described maximum force;

q is the number of magnets $1^i$ located on a circumference of the magnetorotor 3;

p is the number of circumferences vertically laid one over another; and n is the maximum rotational speed of the magnetorotor 3, measured in revolutions per second.

Once the mechanical power to draw is fixed, in order to dimension the cylindrical bores 9, a stroke of the pistons 5 is prefixed, which stroke causes the magnets $1^i$ and $2^i$ to move away from one another, substantially up to the above-cited border distance of "sensible" attraction; for example, if stroke C in FIG. 16=0.95.Δ1 . 1.4, (wherein the coefficient 1.4 is due to the inclination of the $$= \frac{1}{\sin \alpha})$$

then the force, which acts on the pistons 5 in order to separate the magnets $1^i$ and $2^i$ with an acceleration sufficient to let them follow the trajectory shown in FIG. 16, is evaluated. Practically so as not to have braking forces, the withdrawal line must be at least perpendicular to the magnetorotor 3 already at point X, and that position is obtainable by the piston 5 having a velocity $v_p$ approximately equal to 1.5 times the peripheral velocity of the magnetorotor 3 after a very short time, which velocity can for instance be assumed as equal to the time of a tangential relative movement of $$\frac{1}{6} \div \frac{1}{10}$$

of their length l. Such time t is for example:

$$t = \frac{1}{8} \frac{\rho}{wr};$$

Thus, the required force, not considering minor differences, is expressed as follows:

$$F = \frac{m\ v_p}{t}$$

wherein m is the mass of the pistons 5, plus the mass of everything integral thereto (e.g. drive shafts 11, supporting members 14, magnets $2^i$, etc.).

Given this force, the "outward" force SΔp, which the compressed gas, even without the help of the combustion, has to exert on the piston 5 at the point A of maximum approach between the magnets $1^i$ and $2^i$ can be deduced (i.e. S=piston area and Δ p=pressure increase inside the cylinder).

By effecting the calculations, it will be seen how the volumes of the cylinders 3 are much bigger than the volumes corresponding to the stoichiometric ratio.

Owing to simple geometric reasons, such force $$S\Delta p = F + \frac{F_p n}{0.7} \cdot p$$

(The result is overevaluated, since, because of the inclinations, $F_p$ does not have its full theoretical value).

After having evaluated the piston dimensions and the pressure inside the cylinder, it is easy to evaluate the adiabatic expansion work $L_e$ along the stroke AB in FIG. 16:

$$L_e = \frac{1}{k} (0.95 \times 1.4 \times \Delta\ \rho)\ s\Delta p$$

wherein k is assumed to be dependent on ρ, constant pressure, or volume of specific heat cp, cv, etc.)

When injecting the fuel, an amount thereof is injected to produce, with the combustion inside the cylinder 3, an amount of energy equal to the magnetic mechanical work for that single cycle, i.e. equal to the total magnetic energy per cycle minus the magnetic compression work $L_c$ which the pistons 5 and the magnets $1^i$ and $2^i$ will effect in the following cycle, plus the extra amount of mechanical work Δ $E_m$.

Substantially, the energy supplied by the fuel, as previously said, is equal to the total magnetic work in the cycle (ignoring the efficiency ratios).

During the stroke AB, the pistons 5 will be pushed by the gaseous expansion work $L_e$, minus the magnetic compression work, and they will have, at point B, a residual kinetic energy $E_v$, i.e. $E_v = L_e - L_c$.

Having evaluated this energy value, and given the mass m of the piston 5, the supporting members 14, etc., the final velocity of the piston 5 at the point B is easily calculable, i.e. its velocity at the beginning of the compression of the springs 8 of the mechanical energy-restoring system.

Provided the kinematic questions concerning the relationship between the velocity of the piston 5 and the corresponding velocity of the magnetorotor 3 have been correctly evaluated, the number of times of the strokes AB and EF for the piston 5 is easily calculated.

By subtracting these times from the total time spent by one magnet $1^i$ in moving itself by one position, the time is obtained within which compression plus expansion of the energy-restoring system 8 has to take place.

Since the kinetic energy $E_v$ absorbed and then restored by the system is known, the particulars of the same system are easy to determine: in the case of the springs 8, for example, their maximum set, their rigidity, and so on.

The above explanation can be adapted to each one of the different conditions for the speed of the magnetorotor 3, the drawn power, the compression, etc., suitably acting on the time of the injection, ignition and combustion of the fuel, advancing or retarding them so as to obtain the most proper trajectories, according to methods that are well known by people skilled in the field of internal combustion engines.

Once dimensioned, the engine 6, as explained above, ρ, $\tau^1$, $\tau^{IX}$, and η id will consequently reach the values already mentioned in this description, i.e. η id, in particular, will range between 0.50 and 0.75 under the conditions of normal use. The final efficiency rate will range between 0.46 and 0.52 with the engine power going from 30 to 1,000 Hp.

From what has been said, it is understandable that the engine which is the subject of the invention, shows a specific fuel consumption much lower than traditional engines, with much lower pollution. The details of ignition and combustion of the fuel shall be determined, case by case, by technicians skilled in the engineering field, taking into account the new situations of compression and temperatures, (which vary depending on the power used), in order to achieve the best work cycle for the conditions of each use.

By combining the data supplied by the experience in the field of afterburners, as well as in the field of multifuel engines (e.g. the Hesselman engine), it will be possible to obtain the best solution for each single case.

Figure 12:
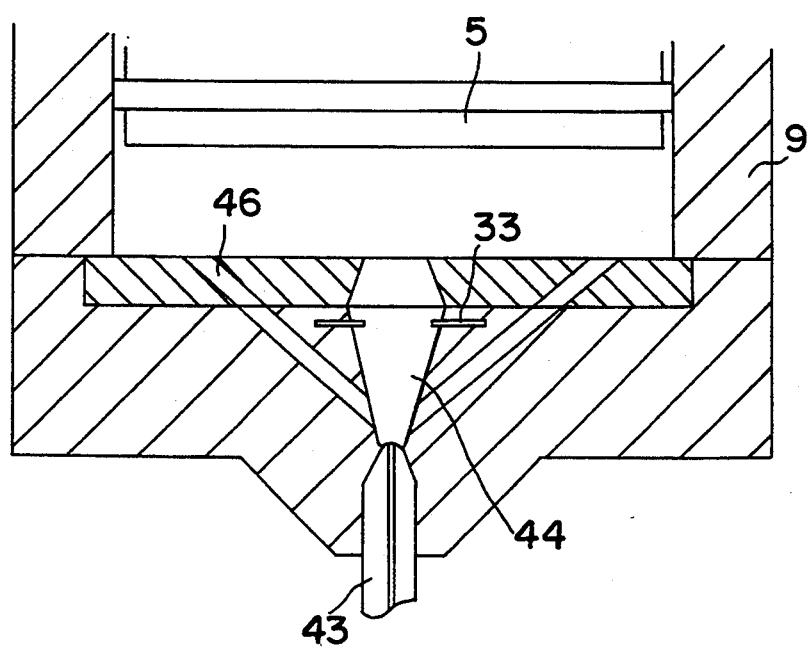
in FIG. 12 a detailed view representing the combustion and ignition area.

A successful solution is suggested by FIG. 12: the fuel is shot by injectors 43 directly toward electrodes 33 (as in multifuel engines), which the fuel reaches after mixing with a prefixed mass of air.

Such air (conceptually corresponding to the primary air of the afterburning technology) will be formed from the air contained inside the prechamber 44 in addition to the air "sucked" by the fuel jet through one or more air ducts 46 because of the Venturi effect.

The fuel, burning while crossing the electrode area, transmits, as gradually as required, the effects of its pressure increase to the remaining gas (actually air) contained inside the cylindrical bore 9 during the first stage AX of the stroke of the piston 5 moving away from the prechamber 44.

It should be noted that the prechamber 44 is substantially "self-regulating", i.e. inside the prechamber 44 at a certain compression ratio, a given mass of air is lodged, which combines itself with the amount of fuel needed for separating the magnets $1^i$ and $2^i$ that are at the distance corresponding to the compression stage; by increasing the compression, at the same time, the amount of fuel needed for separating the magnets $1^i$ and $2^i$ and the air mass is increased, since they were closer than in the previous situation. The mass of air increases according to the compression curve, while the amount of fuel increases according to the attraction force curve, depending on the distance between the magnets $1^i$ and $2^i$.

With the commonly used range of compression ratios $6 \leq \rho \leq 14$, the latter curve has a trend fairly similar to the adiabatic curve trend, and the relatively small differences of the various distances between the magnets $1^i$ and $2^i$ can be corrected by regulating the strength of the compound generated in the prechamber 44, modifying (very slightly) either the amount of fuel, or the number of air ducts 46, or the injection pressure, or the prechamber volume, or all of these factors together. Many pairs of electrodes 33 can be installed along the longitudinal axis of the prechamber 44, so as to make it possible to start the ignition when the fuel is mixed with the required amount of air. (This case is not represented in the drawings).

In the case of very high power, i.e. of relatively high rotational speeds of the magnetorotor 3, with consequently high amounts of kinetic energy to be exploited during the return strokes of the pistons 5, a part of such energy can be transformed into further air compression work that can be used to effect air expansion inside one or many stages of a turbine splined to the drive shaft 7.

Such a solution, which is especially suitable for naval and aeronautical appliances, has not been represented in the drawings, as it is easily imaginable by a person skilled in the engineering field.

If there is a two-stroke engine 6 as seen in FIG. 10, it is necessary to scavenge the exhaust gas, sending it to the discharge air duct 46 while the piston 5 moves away from combustion chamber 9'. That is effectable by a substantially transverse pressurized air jet, as shown in FIG. 10. Such a jet can be formed in various ways, with or without a pressurized air reservoir 32 acting as a plenum chamber, e.g. by either a compressor with rotating members which are connected to the drive shaft, or by electrical energy supplied by the batteries of the vehicle in which the engine 6 is installed.

There is also the possibility (in FIG. 10) to effect the compression by a plurality of pistons 26, preferably parallel to the cylindrical bores 9, of which one or more are connected by a coupling 45 to the piston 5, integral in motion with the pistons 26.

Each one of these pistons 26, after sucking air through a port 27, compresses it during the return stroke up to the setting pressure of a valve 28, through which the gas, at a prefixed pressure, is let into the air reservoir or plenum chamber 32. The gas subsequently passes, through a nonreturn valve 25 and a gas duct 29, into the related cylindrical bore 9.

The latter nonreturn valve 25 is not essential for the cycle inside the cylindrical bore 9. Nevertheless, the valve 25 can sometimes be useful for avoiding an inadequate scavenging air consumption by closing it in case, e.g., the total outward stroke of a piston 5 is considerably higher than the expansion stroke. Such a case will be described later. The shape of the section, its area, and the useful stroke of such pistons 26 may be varied according to the required pressurized-air flow rate. The compression can be effected during the return stroke of the piston 5, as represented in FIG. 10, or during the outward stroke. (This case is not represented in the drawings.)

This system is especially suitable for the embodiment preferred for not too high powers, wherein there are as many cylinders as magnets fixed along an outer circumference of the magnetorotor 3.

As the pistons 5 can be replaced with simple, preferably hollow shafts carrying pressure-sealed rings 31, the cost of the parts is so low that the use of the volumetric compressing pistons 5 is advantageous, provided that their use would not cause unacceptable variations of the trajectory of the magnets $2^i$.

If the above statement is correct, an alternative independent air-compressing system may be used, either electrically or eventually mechanically connected to the drive shaft 7 or to a secondary shaft derived therefrom.

The perspective view of the engine 6 is shown in FIG. 13.

Figure 15:
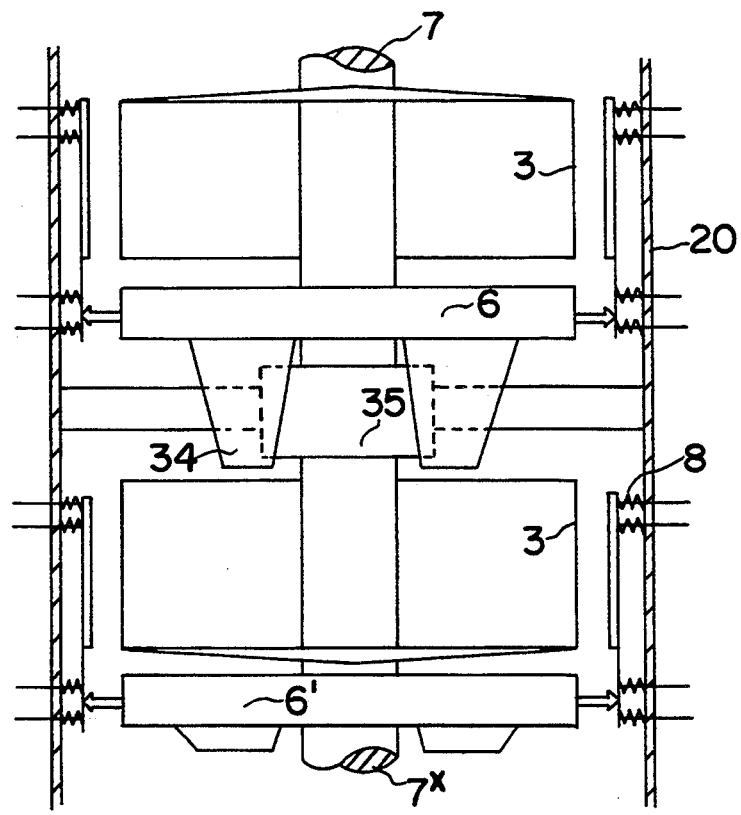
in FIG. 15 two engines mechanically connected "in series" by a motion-invertor.

Given the high reaction to torque transmitted to the supporting frame, (the maximum rotational speed for usual appliances is not higher than 6–10 revolutions per second), it is useful to split the required power into two parts either by means of two counter-rotating engines which are mechanically in parallel or by means of a known rotation-reversing device 35 shown in FIG. 15, in series.

Figure 14:
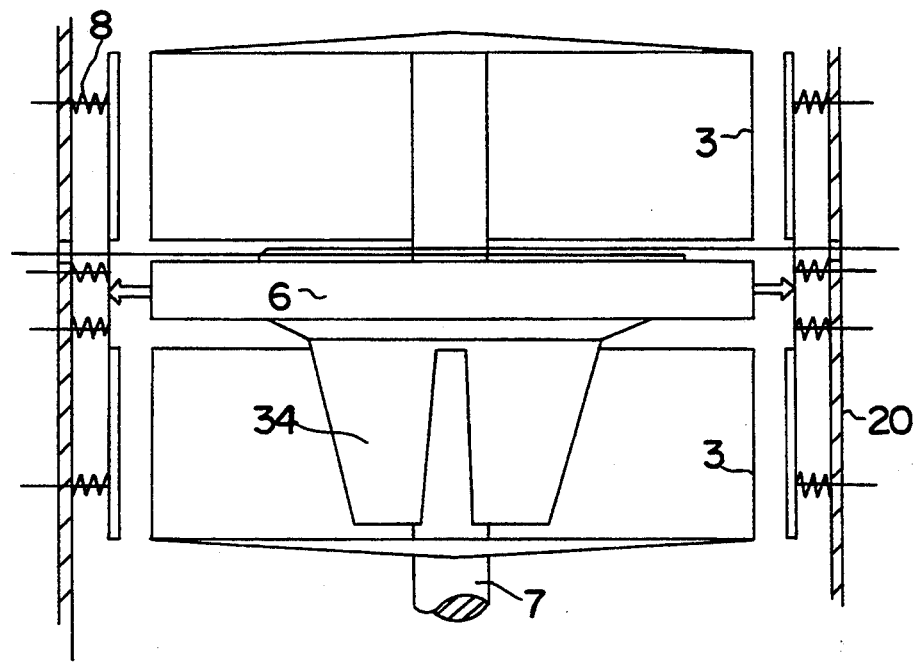
in FIG. 14 a side view of the engine interposed between two overlaid magnetorotors.

In order to reduce the strains on the members 14 which support the magnets $2^i$ and thus their mass and the related inertial force, the inventor prefers to insert each engine 6 between two half magnetorotors 3 (FIG. 14). Such a solution also helps the bushings 21 in FIG. 4 through which the supporting members 14 run, especially in the cases of a single magnetorotor 3, as also shown in FIG. 14.

For cooling down, in the cases of higher powers, it is possible to leave space between the two casings containing two adjacent magnetorotors 3. By doing so, the equivalent heat exchange area results are multiplied by more than three times.

Naturally, cooling fins mounted on the magnetorotors 3 will further improve the heat exchange. In other cases, suitably oriented air streams may be used, and they may be generated either by the vehicle motion or by cooling fans. In the case of very high power, if the air-cooling system were inadequate, it would be easy to cool the engine 6 down by a heat-transferring fluid circulating inside annular or otherwise shaped jackets to be mounted around the magnetorotor 3. Such a solution has not been represented in the drawings.

In most of the cases, space problems are not met, since the magnetorotors 3 carry magnets $1^i$ interspaced by a distance of at least 50% to 70% of their width, in order to avoid interferences among the magnetic fields. All around the engine 6 there is a plurality of free spaces between two adjacent members 14 supporting a certain number of overlaid magnets $1^i$. In the case where the magnets $1^i$, by the effect of the flux baffles 13 fixed thereto, may be contiguous, it will be sufficient to lose a certain percentage of power, by eliminating opposite pairs of supporting members 14. Given the relatively low temperatures in the engine 6 of the invention, a lubricating system using a heat-transferring fluid is normally not needed. Each piston 5, in fact, by the effect of the transversal scavenging air jet, even if at a pressure of 3 $Kg/cm^2$, exerts a pressure against the cylinder wall corresponding approximately from 0.8 to 1.5 $Kg/cm^2$, with a maximum piston velocity of about 12 m/sec. A correct choice of materials and of surface treatments, as well as the eventual use of solid lubricants such as molybdenite, are therefore adequate, especially when using diesel oil or similar essences as fuel (which are notoriously self-lubricating).

The piston 5, and consequently the cylinders 3, never support any pressure besides that mentioned above and the limited pressure given by the seal rings 31, which are not supporting other different kinds of forces having components not parallel to the axes of the cylinders 3.

The present description is intended to give a wide enough explanation to let a skilled person build the engine 6 according to the invention, by exploiting their specific experience in order to choose the best form and location of the various parts, the various ducts, the materials to be used, and so on.

One detail which the inventor suggests concerns the form of the gas duct 29 of the scavenging air jet: it will be useful to shape it as shown in FIG. 10, in order to perform an efficient scavenge in the direction of the arrows with a low pressure and to be able to exploit eventually part of the same pressure (i.e. the part which, because of the tortuousness of the path does not transform itself into kinetic energy) as the first stage of the compression inside the cylinder 3, or for creating a turbulence inside the cylinder 3.

As far as starting the engine 6 is concerned, as already anticipated, it is useful to let the magnetorotor 3 rotate, for example by a manual operation through a device of a known type (for instance, inertial), connected to a floor-type gearshift.

Magnets $2^i$, which are inactive at this stage, oscillate by staying at an intermediate distance between the field limit and the magnets $1^i$, which distance does not generate undesirable Foucault effects at the intersection point between the pressure curve and the attraction-force curve of the magnetic field.

Once the minimum rotational speed is reached, the first injection/ignition will take place, and the engine 6, from then on, will run itself by the control box in FIG. 17. It is however obvious that, in the case of high magnetic-field intensity, a small electric device of a known type may be connected to the drive shaft 7, making it rotate anyway without having to effect compression cycles inside the cylinders 3.

From the above description, it is understandable that the engine 6 according to the invention, either when the vehicle is not going, or even just when the accelerator is totally released, is inactive and does not burn fuel (or emit exhaust gases).

It is of interest to note that, by quickly releasing the accelerator pedal and deactivating (i.e. intending to slow down the vehicle) the pistons 5, thus making them devoid of the kinetic energy supplied by the fuel, these pistons 5 will follow, with decreasing stroke length, trajectories no longer adapted to generate a working torque, but on the contrary, will generate a braking torque, as the trajectories will cross the magnetic attraction field in such a way as to slow down the motion of the magnetorotor 3, as well as the motion of the connected drive shaft 7.

By suitably programming the electronic control box 42, it is also possible to create deliberately, by fuel injection, such trajectories. For example, if the driver, after having quickly released the accelerator pedal, roughly presses the brake pedal (thus giving a reference deceleration on which the control box 42 is programmed), the vehicle is slowed down in cooperation with the existing braking system.

Due to the possibility of activating a selectable number of cylinders 3, again with variable power per cylinder without encountering the problems caused by the crankshaft which is not present in the engine 6 according to the invention, a gear box is in certain cases not strictly needed; also, reverse motion, for example, will be in some cases achievable along suitable trajectories (e.g. path AKZ in FIG. 16).

In the remaining cases, a simple insertable reverse gear or a two-three-gear gear box will be adequate. The fuel consumption of the engine 6, due to the best exploitation of the various kinds of energy used, is very low; the theoretical fuel consumption at 82 HP is approximately one liter of fuel per 20 Km running at maximum speed. Consumption decreases then approximately with the speed cubed, as it has been demonstrated in the foregoing description.

The engine 6 works, as previously stated, with a variable compression, increasing together with increasing power and with the need to increase the fuel quantity. The resulting air volume inside the cylinders 3 considerably exceeds the stoichiometrically required volume; consequently, the substantial absence of CO, HC and many nitrogen compounds within the gas is achieved, and a good combustion efficiency is also achieved at low speed with low compression ratios.

That result, together with the very low consumption of fuel at low speeds and the idling of the engine 6 when the vehicle is not in motion, makes it advantageous to use the engine 6 for city traveling because it produces exhaust at a low pollution rate.

The economical and environmental results achieved by this engine 6 are immediately clear; they add up to the possibility of obtaining good acceleration at any intermediate speed without torque-amplification systems for heavy vehicles.

The engine 6 is adapted for use on any kind of transportation vehicle, e.g. cars, airplanes, and ships; it is also quite suitable for being used on a helicopter.

The rotational speed (i.e. 6 to 10 r/sec) of the drive shaft 7 is in fact, very close to the commonly adopted rotational speed of a propeller shaft. The heat emitted from the engine 6 by radiation can easily be kept from reaching the magnets $1^i$ of the magnetorotor 3 by applying an insulating layer, covered by a thin sheet of reflecting material, onto the inside of the magnetorotor 3. The low level of heat eventually produced by the magnets $1^i$, because of parasitic currents or because of other energy losses, is automatically removed by air by the effect of the pulsating motion of the supporting members 14 combined with the rotating motion of the magnetorotor 3.

An interesting possibility of varying the trajectories of the motion of the magnets $2^i$ fixed on the supporting members 14 in a further suitable way deserves an explanation. This result can be achieved by varying the distance between the energy-restoring systems 8 and the supporting members 14 for a constant rotational speed of the magnetorotor 3. By doing so, a more advantageous torque/speed curve is obtained. FIG. 17 shows, in one of the preferred embodiments, a stiff slidable facing member 40 fixed to the maximum kinetic energy of either a single piston 5 or a group of mechanically connected pistons 5.

A flat plate 37, parallel to the stiff slidable facing member 40, is interposed between the member 40 and the fixed structure 20, said flat plate 37 carrying at least one wedge-shaped projecting part 37' having a thickness which decreases along its longitudinal axis to a minimum at positions where either each elastic spring 8 or a group of elastic springs 8 is fixed.

By allowing the flat plate 37 to slide longitudinally with respect to the stiff member 40, the wedge-shaped projecting parts 37' fit between the member 40 and the fixed structure 20, modifying the distance between them from zero up to the maximum thickness of the adjacent wedge-shaped projecting part 37'. The projecting part 37', when not totally inserted between the member 40 and the structure 20, projects sideways through holes 40' formed on the same member 40. Many methods can be used to allow the plate 37 to slide, for example, by fixing one end 37" thereof to a keeper of an electromagnet 38, whose induction current is controlled by the control box 42, which determines its stroke according to the angular speed or acceleration, either in response to the instructions given by the driver, or in response to the length of the compression stroke running in the last cycle, or in response to many of these factors combined with each other.

It is possible to modify the device by connecting the elastic springs 8 to related supporting members 14 instead of to the stiff member 40. This modification does not need any further explanation, as it would appear clear to people skilled in the art.

The advantages offered by the invention are evident. Referring to FIG. 18, the best trajectory normally achievable with a magnetorotor 3 is along path ABC. With the use of the above-described device along path DEF for a given rotational speed, the velocity $v_p$ of the magnet $1^i$, in the represented case, is multiplied by more than three. Accordingly, there is also multiplied by 3 the compression work performed by the magnet $1^i$. Consequently, the approach stroke of the magnet $1^i$ increases by approximately $\sqrt{3}$, i.e. 1.75 times. That result causes a power and torque increase, for the given rotational speed wr of the magnetorotor 3, of about 3 times, as previously mentioned.

(The length of the segment HK is equal to the thickness of the wedge-shaped projection 37'). By suitably dimensioning every part, it is possible to obtain the maximum torque for any rotational speed used.

A further method for moving the plate 37 may be by connecting it to a pneumatic, oil-operated or similarly operated piston 5, "driven" by the control box 42, or to insert a sealed expandable chamber between the member 40 and the fixed structure 20, regulating, again by the control box 42, its thickness, or to use other methods not shown in the drawings.

Figure 11:
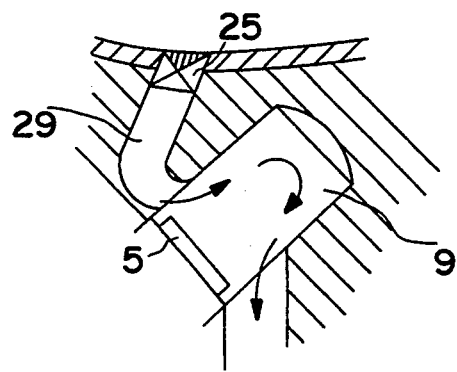
in FIG. 11, a particular path suggested for the pressurized scavenging air.

As already mentioned, in the (frequent) cases wherein the above-described device is used, it may be helpful to have the ability to shut off the nonreturn scavenge-air inlet valve 25, seen in FIGS. 10 and 11, when the piston 5 has reached a selected position during its outward stroke, so that amounts of compressed scavenge air are not wasted, thus worsening the global efficiency rate of the engine 6.

From what has been described up to this point, it can be deduced that, in an engine 6 comprising the described magnetorotor 3, it is possible to perform the following functions:

at a constant rotational speed of the magnetorotor 3, it is possible to vary the torque, hence the power on the drive shaft 7, by modifying the stroke length and the fuel amount; or achieving a constant torque for different rotational speeds of the magnetorotor 3, i.e. of the drive shaft 7, by keeping the fuel amount per cycle substantially constant and modifying the stroke-length.

It is clearly possible, by using a suitably programmed control box 42, to effect a wide interpolation, thus obtaining, for each use of the engine 6, the required torque and power.

I claim:

1. An apparatus for moving one of a first member and a first group of members along a first trajectory, by moving one of a second member and a second group of members according to a rectilineal reciprocating motion along a second trajectory not parallel to the first trajectory, said apparatus comprising:

(a) one of two permanent magnets (1, 2) and two groups of permanent magnets ($1^i$, $2^i$), being fixed on one of the members and the groups of members, respectively, without any mechanical connection and contact between the members and the groups of members, but with magnetic forces originating from an interaction between the magnetic fields of the two permanent magnets (1, 2) and the two groups of permanent magnets ($1^i$, $2^i$);

(b) an imaging first cylinder having a geometrical center and an outer circumference, said first cylinder also having one of the two groups of permanent magnets ($2^i$) moved according to the rectilineal reciprocating motion and distributed radially about the geometrical center;

(c) said first member being a second cylinder (3) having a rotational axis, said second cylinder (3) moving according to a rotative motion and also having another of the two groups of permanent magnets ($1^i$) fixed around its outer circumference;

(d) at least one internal combustion engine having a group of pistons (5), connected to the one of the two groups of permanent magnets ($2^i$), for imparting the rectilineal reciprocating motion thereto;

(e) a drive shaft (7) being connected to the second cylinder (3) on which the other of the two groups of permanent magnetic (1$^i$) is fixed;

(f) a plurality of combustion chambers (9') from which gas expands to perform an outward stroke on the group of pistons (5) and on the one of the two groups of permanent magnets (2$^i$) connected thereto; and (g) a mechanical energy-restoring system (8), also connected to the one of the two groups of permanent magnets (2$^i$), for effecting a return stroke in combination with the interaction between the magnetic fields of the two permanent magnets (1, 2) and the two groups of permanent magnets (1$^i$, 2$^i$);

whereby one of the first member and the first group of members is moved along the first trajectory without substantial energy loss.

2. The apparatus according to claim 1, wherein the one of the two permanent magnets (1, 2) and the two groups of permanent magnets (1$^i$, 2$^i$) is ferromagnetic.

3. The apparatus according to claim 1, wherein at least one internal combustion engine is a two-stroke engine (6) having the group of pistons (5) housed inside the plurality of combustion chambers (9').

4. The apparatus according to claim 1, wherein each one of the plurality of combustion chambers (9') is provided with at least one air duct (46) and a pre-combustion chamber (44) in which a fuel injector (43) and a plurality of ignition electrodes (33) are installed.

5. The apparatus according to claim 4, wherein each one of the plurality of combustion chambers (9') is further provided with at least one air jet means for effecting a scavenge of any exhaust gas left after an explosion.

6. The apparatus according to claim 1, further comprising:
an air compressor mechanically connected to the drive shaft (7).

7. The apparatus according to claim 6, further comprising:
an electrical motor means for operating the air compressor.

8. The apparatus according to claim 6, wherein the air compressor is a volumetric type.

9. The apparatus according to claim 5, further comprising:
a plurality of piston means (26) for compressing air to be fed to the air jet means.

10. The apparatus according to claim 9, further comprising:
a reservoir means (32) for receiving the scavenge of any exhaust gas.

11. The apparatus according to claim 4, further comprising:
electronic box means (42) for controlling the fuel injector (43) and the plurality of ignition electrodes (33) installed in each one of the plurality of combustion chambers (9').

12. The apparatus according to claim 11, wherein the electronic box means (42) controls timing of fuel injection and ignition inside each one of the plurality of combustion chambers (9').

13. The apparatus according to claim 12, wherein the electronic box means (42) effects the timing and regulation of the fuel injection and the ignition, depending upon peripheral velocity and angular acceleration of the cylinder (3).

14. The apparatus according to claim 1, wherein a direction of motion of each one of the group of pistons (5) is inclined with respect to a direction of motion of the other of the two groups of permanent magnets (1$^i$) fixed around the outer circumference of the first cylinder.

15. The apparatus according to claim 3, wherein the mechanical energy-restoring system (8) includes a plurality of elastic-to-compression elements located circumferentially around the cylinder (3) in correspondence to each one of the group of pistons (5).

16. The apparatus according to claim 1, further comprising:
a rigid member (40) being connected to the mechanical energy-restoring system (8) and having a plurality of holes (40') bored therethrough; and
a flat plate (37), positioned parallel to and facing the rigid member (40), said flat plate (37) having a lower end (37''), an upper end, and at least one wedge-shaped projecting part (37').

17. The apparatus according to claim 62, further comprising:
means, connected to the flat plate (37), for allowing the wedge-shaped projecting part (37') to slide longitudinally in increments from one to another of the plurality of holes (40') in the rigid member (40).

18. The apparatus according to claim 17, wherein said allowing means includes an electromagnet (38) positioned at the lower end (37'') of the flat plate (37) and also includes a counteracting spring (39) positioned at the upper end of the flat plate (37).

19. The apparatus according to claim 18, wherein said electromagnet (38) has one of a pneumatic cylinder and an oil-operated cylinder.

20. The apparatus according to claim 11, wherein the electronic box means (42) is coupled to the second cylinder (3).

21. The apparatus according to claim 3, wherein the mechanical energy-restoring system (8) includes at least one torsion spring having a rigidity coefficient such that maximum kinetic energy of the group of pistons (5) is absorbed.

* * * * *